United States Patent
Sadiku

(10) Patent No.: US 11,539,274 B2
(45) Date of Patent: Dec. 27, 2022

(54) METHOD AND DEVICE FOR PRODUCING ROTORS AND STATORS INCLUDING THE PRODUCTION OF CONNECTION WIRES

(71) Applicant: Schaeffler ELMOTEC STATOMAT GmbH, Karben (DE)

(72) Inventor: Sadik Sadiku, Neuberg (DE)

(73) Assignee: Schaeffler ELMOTEC STATOMAT GmbH, Karben (DE)

(*) Notice: Subject to any disclaimer, the term of this patent is extended or adjusted under 35 U.S.C. 154(b) by 223 days.

(21) Appl. No.: 16/959,676

(22) PCT Filed: Dec. 20, 2018

(86) PCT No.: PCT/EP2018/086316
§ 371 (c)(1),
(2) Date: Jul. 2, 2020

(87) PCT Pub. No.: WO2019/134849
PCT Pub. Date: Jul. 11, 2019

(65) Prior Publication Data
US 2021/0036588 A1 Feb. 4, 2021

(30) Foreign Application Priority Data

Jan. 2, 2018 (DE) ............... 10 2018 100 016.2

(51) Int. Cl.
*H02K 15/04* (2006.01)
*H02K 15/06* (2006.01)
(52) U.S. Cl.
CPC ......... *H02K 15/045* (2013.01); *H02K 15/068* (2013.01)
(58) Field of Classification Search
CPC ................. H02K 15/045; H02K 15/068
See application file for complete search history.

(56) References Cited

U.S. PATENT DOCUMENTS 3,407,490 A * 10/1968 Gibbs ............... H02K 15/005
29/606
3,675,300 A * 7/1972 Reust ............... H02K 15/095
29/735
(Continued)

FOREIGN PATENT DOCUMENTS

DE 102010034180 2/2012
EP 0963031 12/1999
(Continued)

OTHER PUBLICATIONS

International Preliminary Report on Patentability dated Jul. 7, 2020 From the International Bureau of WIPO Re. Application No. PCT/EP2018/086316. (13 Pages).
(Continued)

*Primary Examiner* — Carl J Arbes

(57) ABSTRACT

A method used for producing rotors and stators of electric motors, including the production of connection wires, and comprises the following steps:
  Winding the coil windings (12), which comprise a plurality of individual wires (14), on a wire winder (28) to which the individual wires (14) are fed from a wire supply unit (16) via a wire guide 18, 20, 22),
  Depositing the coil windings (12) in a draw-in tool (36),
  Drawing the coil windings (12) into grooves of a stator (84) or rotor body,
  Combining the individual wires (14) in phases by means of slide-on tubes (52) to produce the connection wires of the stator or rotor in question. In order to be able to automate the production of the connection ends, which was previously carried out manually, it is proposed that the individual wires (14) of each coil winding (12) are fastened to each other in the region of the wire guide (18, 20, 22) in order to form winding ends (46) and winding beginnings (32), after the winding and before
(Continued)

or during the depositing, the winding ends (46) and winding beginnings (32) of each coil winding (12) are fastened in first position holders (42, 44) arranged in certain positions with respect to the draw-in tool, and during the drawing of the coil windings (12) into the stator or rotor, the winding ends (46) and winding beginnings (32) are transferred from the first position holders (42, 44) into second position holders (90, 92) arranged in certain positions with respect to the stator body (84) or rotor body. The present invention also relates to a device for carrying out the aforesaid method.

20 Claims, 8 Drawing Sheets

(56) References Cited

U.S. PATENT DOCUMENTS

| | | | | |
|---|---|---|---|---|
| 4,428,113 | A * | 1/1984 | Fischer | H02K 15/0068 29/736 |
| 4,951,379 | A * | 8/1990 | Clemenz | H02K 15/0068 242/432 |
| 5,065,503 | A * | 11/1991 | Luciani | H02K 15/0068 29/736 |
| 5,291,649 | A * | 3/1994 | Lombardi | H02K 15/0068 242/432 |
| 5,535,503 | A * | 7/1996 | Newman | H02K 15/0068 310/216.022 |
| 5,542,456 | A | 8/1996 | Nishimura et al. | |
| 6,009,618 | A * | 1/2000 | Takahata | H02K 15/068 29/736 |
| 6,446,678 | B1 * | 9/2002 | Becherucci | H02K 15/068 140/92.1 |
| 6,557,238 | B1 * | 5/2003 | Becherucci | H02K 15/0062 140/92.1 |
| 7,370,401 | B2 * | 5/2008 | Stratico | H02K 15/068 29/736 |
| 8,281,481 | B2 * | 10/2012 | Shives | H02K 15/064 29/598 |
| 2007/0007832 | A1 | 1/2007 | Ichikawa et al. | |

FOREIGN PATENT DOCUMENTS

| | | |
|---|---|---|
| GB | 2096497 | 10/1982 |
| WO | 2000055960 A1 * | 9/2000 |
| WO | WO 00/55960 | 9/2000 |
| WO | WO 2019/134849 | 7/2019 |

OTHER PUBLICATIONS

Internationaler Recherchenbericht und Schriftlicher Bescheid [International Search Report and the Written Opinion] dated Apr. 8, 2019 From ther International Searching Authority Re. Application No. PCT/EP2018/086316 and Its Translation of Search Report Into English. (13 Pages).

\* cited by examiner

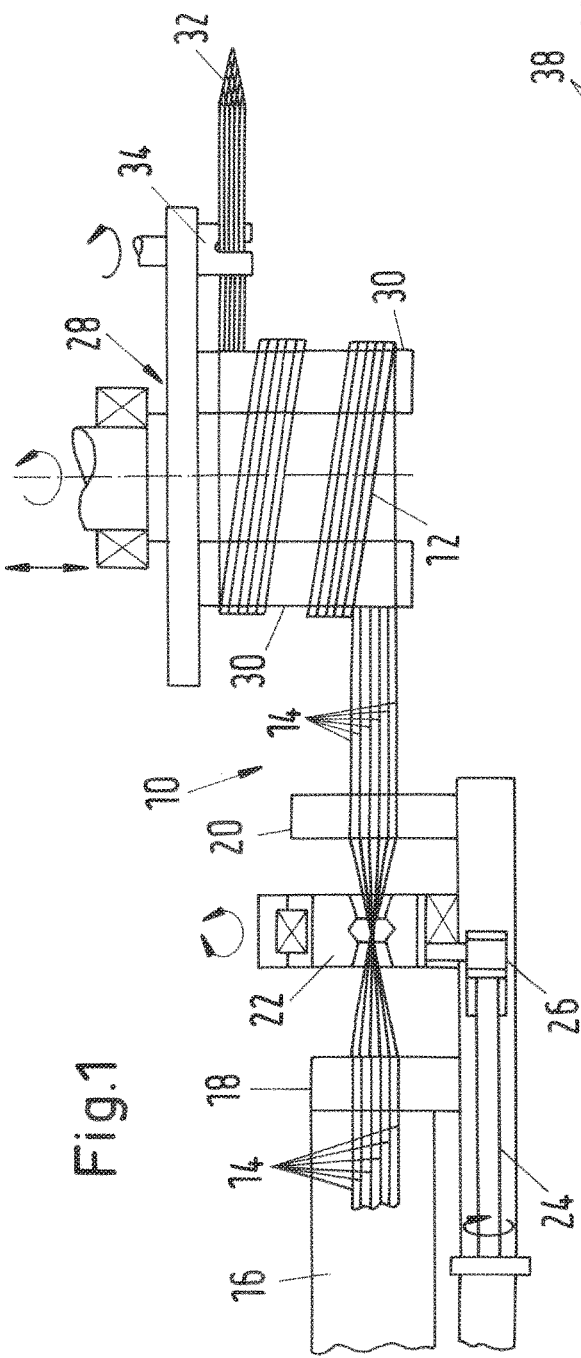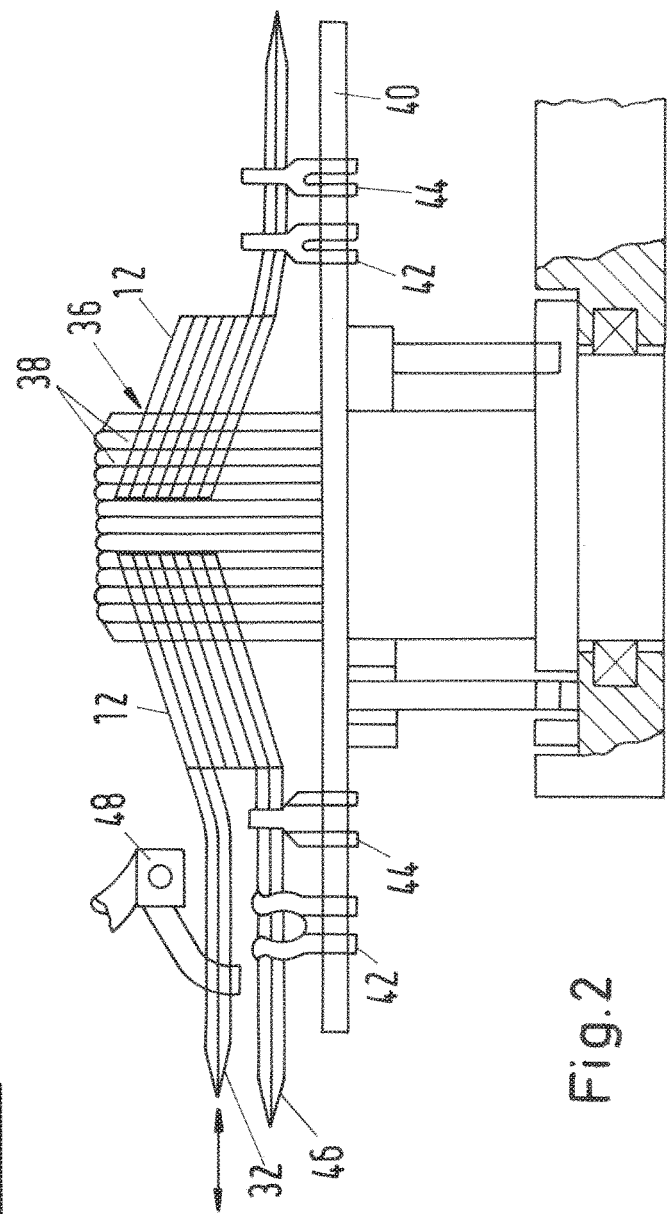

METHOD AND DEVICE FOR PRODUCING ROTORS AND STATORS INCLUDING THE PRODUCTION OF CONNECTION WIRES

RELATED APPLICATIONS

This application is a National Phase of PCT Patent Application No. PCT/EP2018/086316 having International filing date of Dec. 20, 2018, which claims the benefit of priority of German Patent Application No. 10 2018 100 016.2 filed on Jan. 2, 2018. The contents of the above applications are all incorporated by reference as if fully set forth herein in their entirety.

FIELD AND BACKGROUND OF THE INVENTION

The invention relates to a method for manufacturing rotors and stators, including the production of connection wires according to the preamble of claim 1 and relates to a device for carrying out such a method. The subject matter of the present invention is also a device for carrying out such a method.

Such a method usually has the following steps:
   Winding the coil windings, which comprise a plurality of individual wires, on a wire winder to which the individual wires are fed from a wire supply unit via a wire guide,
   Depositing the coil windings in draw-in tools,
   Drawing the coil windings into grooves of a stator or rotor body,
   Combining the individual wires in phases by means of slide-on tubes to produce the connection wires of the stator or rotor in question.

This method has the drawback that it can only be partially automated, because the gripping of the individual wires and the drawing or sliding on of the slide-on tubes has to be carried out manually due to the undefined position of the individual wires.

SUMMARY OF THE INVENTION

The object of the invention is to provide a method and a device of the type mentioned in the foregoing which allows automation of the production of stators or rotors with ready-made connection wires.

Main features of the invention are set out in the characterising portions of claims 1 and 11. Embodiments of the method are the subject matter of claims 2 through 10; further developments of the device are the subject matter of claims 11 through 17.

The method according to the invention provides that the individual wires of each coil winding are preferably fastened to each other in the region of the wire guide in order to form winding ends and winding beginnings, after the winding and before or during the depositing, the winding ends and winding beginnings of each coil winding are fastened in first position holders arranged in certain positions with respect to the draw-in tools, and, during the drawing of the coil windings into the stator or rotor, the winding ends and winding beginnings are transferred from the first position holders into second position holders arranged in certain positions with respect to the stator body or rotor body.

The method according to the invention makes use of the defined position of the individual wires of a winding in the wire supply unit in order then to grasp them at this point by means of suitable means, which will be discussed in more detail later, and to attach them to one another at a winding beginning and/or winding end. Ideally, one winding beginning and one winding end are produced simultaneously at the separation point, at which two successive coil windings are separated by a separation draw-in tool in the region of the wire supply device.

By attaching the ends of the individual wires to each other, the winding ends and beginnings are stabilized and are suitable for automated wire handling. In this way, a defined position can be ensured until the final production of a stator or rotor so that, in the entire process, the winding ends and beginnings can be gripped in a defined position by a suitable handling device for the next processing step up until the attachment of connecting lugs for the electrical connections of the stator or rotor.

In one preferred embodiment of the invention, it is provided that the slide-on tubes are placed onto the winding ends and/or beginnings before the coil windings are drawn into the stator or rotor body.

Providing the drawing-in step at this early point in time has the advantage that the winding ends and beginnings are also stabilised, and the individual wires are held in a defined position over the length of the slide-on tube. Otherwise, there would be the risk that individual wires could deform when deposited in the draw-in tool or when drawn into the stator grooves, which could make subsequent, automated drawing on or sliding on of the slide-on tubes more difficult. The early covering of the associated individual wires also offers the advantage that in all of the process steps the slide-on tubes offer a favourable contact surface for all of the handling devices used.

One preferred further development of the method provides that the individual wires of the winding ends and/or beginnings are compacted to a diameter which is smaller than the inner diameter of the slide-on tubes before the slide-on tubes are deposited. "Compacting" shall be construed to mean that the individual wires are pressed closer together than would be the case if the individual wires were lying together loosely. The slide-on tubes, which generally comprise an elastic fabric but may also comprise of a homogeneous elastic material, can also be threaded through the winding ends or beginnings more easily for this reason. Once the ends of the individual wires are threaded into the end of the tube, the slide-on tube can adapt well to short expansion points of the overall diameter of the individual wires using individual bends, or, when it is slid on, it can also compress the bulging individual wires to a smaller overall diameter. Doing so does not significantly increase the force required for sliding the tubes on.

The method is particularly preferably further developed in such a way that the individual wires are twisted with each other to form the winding ends and/or beginnings. Twisting has the advantage over other alternatives (e.g., welding or gluing the individual wires or adding a sleeve around the individual wires) that it can be carried out very easily in an automated manner and that it does not have to take into account any particularities in the further method steps due to the type of connection of the individual wires.

For example, the twisting can be carried out simply and in such a way that the individual wires are guided in the region of the wire supply device by an individual wire guide which can be rotated about an axis of rotation parallel to the wire guide direction. The individual wire guide comprises guides corresponding to the number of individual wires and arranged on a common holding element, which can be rotated in the aforesaid manner. The individual wires can thus be twisted together by twisting the individual wire guide about a suitable angle of rotation until the desired twisting is achieved. For this purpose, the rotatable individual wire guide is generally arranged between two rigid wire guides which form the counter holding element so that the twisting takes place only in a desired end region which forms the winding ends or beginnings. After twisting, the wires are then cut in the twisted region, so that one half forms the winding end of the preceding winding, and the other half forms the winding beginning of the subsequent winding. Due to said twisting, the individual wires are also shaped into a tapered tip as an instance of compacting.

The rotatable individual wire guide has the further advantage that it can also be used to rotate the position of the individual wires relative to one another, e.g., by 180° during a winding process. It has been shown that the electrical losses of stators produced can be reduced with such coil windings.

As an alternative or in addition to compacting the individual wires at the ends of the winding ends or winding beginnings, it can be provided that the inner diameter of the slide-on tubes is widened on the slide-on side before being slid onto the winding ends and/or beginnings. For this purpose, for example, a cone can be inserted into the slide-on tube, through the expanded end of which the possibly compacted individual wires of the winding ends or beginnings are then guided into the respective slide-on tube.

One expedient further development of the method provides that the slide-on tubes are aligned with the winding ends and/or beginnings by means of a centring device which is inserted into that slide-on tube. Due to this clamping of the slide-on tubes, the latter are easier to handle and also cannot change their shape in the process, so that process reliability is enhanced.

For the preferred further development of the centring method step, it is provided that the centring device has a movable gripper, with which the winding ends or beginnings are gripped and compacted. In this way, the grippers guided through the slide-on tube align and fix the slide-on tube relative to a winding end or winding beginning. At the same time, by pressing together and therefore compacting the individual wires, the gripper makes it easier to slide, draw, or push the slide-on tube onto the wires.

One preferred further development for handling the slide-on tubes provides that the slide-on tubes are produced at a certain length before being slid on and are received in a magazine by means of which the position of the slide-on tubes is defined relative to the centring device, e.g., by being designed as part of the centring device.

Another preferred measure for improving handling of the winding ends and winding beginnings and of the finished stator is for each of the winding ends and/or beginnings covered with the slide-on tubes to be fixed, with reference to the rotor or stator body, in a one of a plurality of second position holders. In this way, the winding ends and beginnings can be deposited in curves on disc-shaped supports which are assigned to a stator or rotor carrier in which the rotor or stator equipped with the coil windings is held. The defined depositing facilitates the winding ends and beginnings being picked up again, on the one hand, and, on the other hand, the diameter of the disk-shaped support can be reduced so that the overall dimensions of the stator carrier can be reduced, which in turn benefits handling thereof.

In principle, it should also be noted that the method can initially only be carried out for a portion of the coil windings, for example, the windings of one phase, and can then be repeated for the other phases or remaining coil windings.

The subject matter of the present invention also relates to a device for carrying out the method described in the foregoing. Included in addition to the device features are:
  a wire supply unit for parallel feeding of individual wires which together form a coil winding for a stator or rotor of an electric motor,
  a wire winder with winding templates on which the coil windings are successively wound, a template gripper being provided for holding the beginnings of the individual wires on the wire winder,
  a draw-in tool for receiving the coil windings after winding,
  a stator or rotor carrier for receiving a stator or rotor body, and a transfer device for transferring the coil windings from the draw-in tool into the stator or rotor body, which are known from the prior art. It is provided according to the invention that at least one connecting device is also provided, by means of which the wire beginnings and/or ends of the individual wires are connected to one another to form winding ends or beginnings.

With this addition, the cut ends and beginnings of the windings, which were previously difficult to control, are shaped at the ends and beginnings of the windings, which enable the use of suitable grippers to automate individual steps in the manufacturing process of a stator or rotor.

In one preferred further development of the device according to the invention, it is provided that the connecting device comprises a single-wire guide in the region of the wire supply unit which can be rotated about an axis of rotation parallel to the feed direction of the individual wires to the wire winder.

The rotatable single-wire guide can initially perform the task of twisting the individual wires as desired by rotating them. In this case, the winding ends and beginnings created are also advantageously tapered, i.e., compacted.

One particularly preferred further development of the device provides that first position holders for the winding ends and winding beginnings are provided in a defined position with respect to the draw-in tools and second position holding devices for the winding beginnings and winding ends are provided in a defined position with respect to the transfer device.

One preferred addition to the device is that a centring device for aligning and an attaching device for drawing on slide-on tubes are provided on the respective winding end or the respective winding beginning.

The centring device is used to handle the slide-on tubes, which are only somewhat dimensionally stable, to align them with respect to the winding ends and beginnings, and, above all, to make the winding ends and beginnings even easier to handle for further process steps using the tubes that have been slid on.

One preferred further development of the centring device provides that the latter has a gripper for gripping and compacting the winding ends or winding beginnings and can be passed through the inner diameter of the slide-on tubes. This embodiment offers the advantage that it simultaneously stabilizes the slide-on tubes and aligns them relative to the winding ends and beginnings.

Another preferred embodiment of the attaching device provides that the latter comprises at least one carrier for gripping and drawing or sliding the slide-on tubes onto the winding ends or beginnings. After the gripper has aligned the slide-on tube and fixed the specific winding end or the winding beginning, the carriers grip the slide-on tube and push it over the gripper and the tapered end onto the specific winding end or winding beginning. The catches can be designed in a pincer-like fashion and carry the tube with them by friction, but with a fabric tube or also a rubber-like tube, small short projections can ensure a positive connection.

One preferred further development of the gripper can provide that it comprises a pincer-like device and an actuating tube that is movable axially relative to the pincer-like device and that moves the pincer-like device into a closed position by means of an axial adjustment. This embodiment has a very compact diameter and can be matched to the diameter of the slide-on tubes, it being possible to use the actuating tube directly for centring the slide-on tube surrounding it.

BRIEF DESCRIPTION OF THE SEVERAL VIEWS OF THE DRAWINGS

Additional features, details, and advantages of the invention result from the wording of the claims and from the following description of exemplary embodiments with reference to the drawings. In the drawings:

FIG. 1 is a schematic view of a device for producing coil windings;

FIG. 2 is an elevation of a draw-in tool for receiving coil windings;

DESCRIPTION OF SPECIFIC EMBODIMENTS OF THE INVENTION

Figure 3:
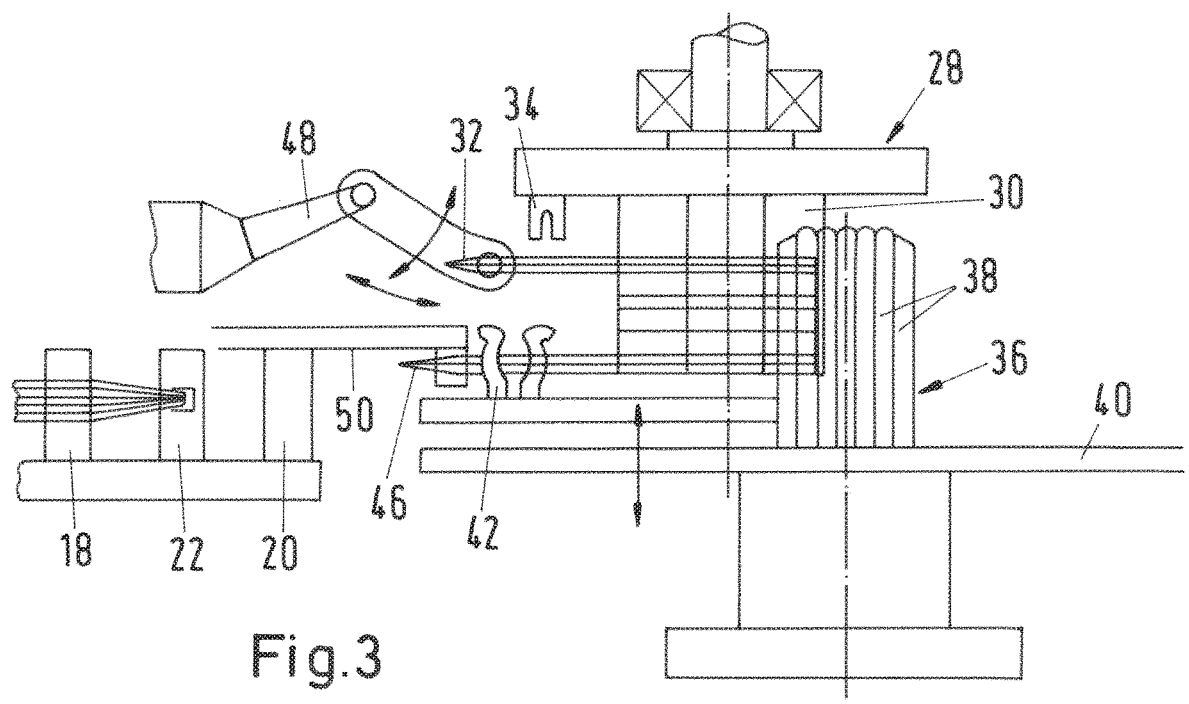
FIG. 3 is a schematic view of the process for transferring the coil windings from the wire winder to the draw-in tool.

FIG. 1 illustrates a device 10 for winding coil windings 12 made of individual wires 14. In the exemplary embodiment shown, six individual wires 14 each form a coil winding 12. The six individual wires 14 are fed via a suitable wire supply unit 16, known per se, which draws the individual wires 14 from wire supply coils, not shown. The individual wires 14 are guided via a first fixed wire guide 18 and a second fixed wire guide 20, a single wire guide 22 which can be rotated with respect to the feed direction being arranged between the two fixed wire guides 18, 20. The drive is illustrated schematically by a drive shaft 24 which drives the rotatable single wire guide 22 via a gear drive 26. Furthermore, the wire supply device 16 comprises a separating device, which is itself known and therefore not shown, in the region of the rotatable individual wire guide 22.

The winding coils themselves are wound using a wire winder 28, which is itself known, with an adjustable winding template 30 and about which the individual wires are wound by a rotary movement of the entire wire winder 28. A winding beginning 32 of the coil winding is fixed to a template wire holding element 34 rotating with the wire winder 28.

FIG. 2 illustrates a movable draw-in tool 36 which comprises a plurality of draw-in lamellae 38 arranged in a ring-shape and into which the coil windings 12 are deposited. The draw-in tool 36 also comprises a bobbin plate 40 which, in contrast to known embodiments of such draw-in tools, is designed to have first position holders 42, 44 for winding ends 46 and the winding beginnings 32 already mentioned. The entire draw-in tool 36 is rotatable and axially movable relative to the wire winder 28, in which case the bobbin plate 40 may be axially adjustable relative to the draw-in lamellae 38. The drive mechanism 46 for adjusting the bobbin plate 40 and/or the draw-in lamellae 38 shall not be discussed in greater detail here.

FIG. 2 also shows a first handling gripper 48 which can remove the winding beginnings 32 initially held there in the template wire holding element 34 and transfer them to a first position holder 44 for a winding beginning 32.

The winding process takes place in such a way that a winding beginning 32 produced by the rotatable individual wire holding element 22 is first clamped in the template wire holding element 34. The wire winder 28, of which there may also be two or more for simultaneously winding a plurality of coil windings 12, is then rotated until the desired number of turns of the six individual wires 14 is wound on the winding template 30. The rotatable individual wire holding element 22 can be rotated 180° once or several times between the individual turns, so that the arrangement of the adjacent individual wires 14 is switched.

Once the winding process has concluded, the rotatable individual wire holding element 22 is rotated about a suitable angle of rotation, which can be 360° or more, to twist the wires. The individual wires are then rotated in the region of the rotatable individual wire holding element 22, so that a winding end 46 of the coil winding 12 which has just been wound and a winding beginning 32 of the coil winding 12 to be wound next are produced at the same time. The coil winding 12 produced is then transferred to the draw-in tool 36, this transfer being illustrated in FIG. 3.

Figure 4:
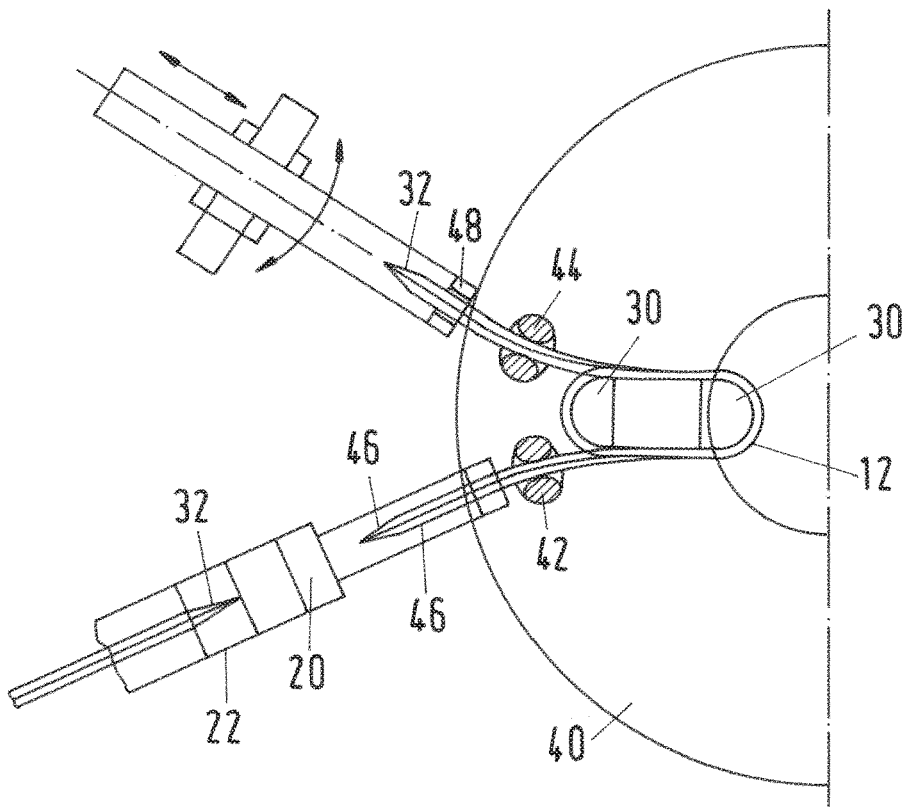
FIG. 4 is a schematic plan view of a coil plate of the draw-in tool with a transferred coil winding.

FIG. 3 also illustrates the two fixed wire guides 18, 20 and the rotatable individual wire guide 22 arranged therebetween, which in this case holds the already separated, twisted winding beginning 32 of the subsequent coil winding 12. The winding end 46 of the previously wound coil winding 12 will have already been gripped by a second handling gripper 50 which clamps the winding end 46 in a first position holder 42 provided in front of it, while the first handling gripper 48 removes the winding beginning 32 from the template wire holding element 34 and clamps it in the first position holder 44 for the winding beginning 32. The position of the two position holders 42, 44 for the winding end 46 and the winding beginning 32 on the bobbin plate 40 may be seen in the plan view according to FIG. 4, which also shows the two handling grippers 48, 50. In addition, the coil winding 12 illustrated in FIG. 4 shall be construed only as an example. Using suitable axially-adjustable winding templates, it is also possible, with a corresponding wire winder, for example to wind two coil windings 12 which are already wired to one another, and these are then deposited together in the draw-in tool. This means that the winding beginnings and ends of these coil windings are already connected, so that only the winding end of one of the two coil windings and winding beginning of the other coil winding have to be clamped in the first position holders 42, 44. These are then generally at a greater angular distance from one another than is illustrated in FIG. 4.

FIG. 3 also illustrates the usual process of depositing the coil windings 12 in the draw-in tool 36 by moving the draw-in tool 36 axially in the direction of the aligned winding template 30 of the wire winder 28. After the wound coil winding 12 has been deposited in the draw-in tool 36, the next coil winding 12 can be wound by means of the wire winder 28, so that there is time available to cover the individual wires 14 connected to each other by twisting with a slide-on tube 52 over a desired length, which up to now has had to be done manually.

Figure 5:
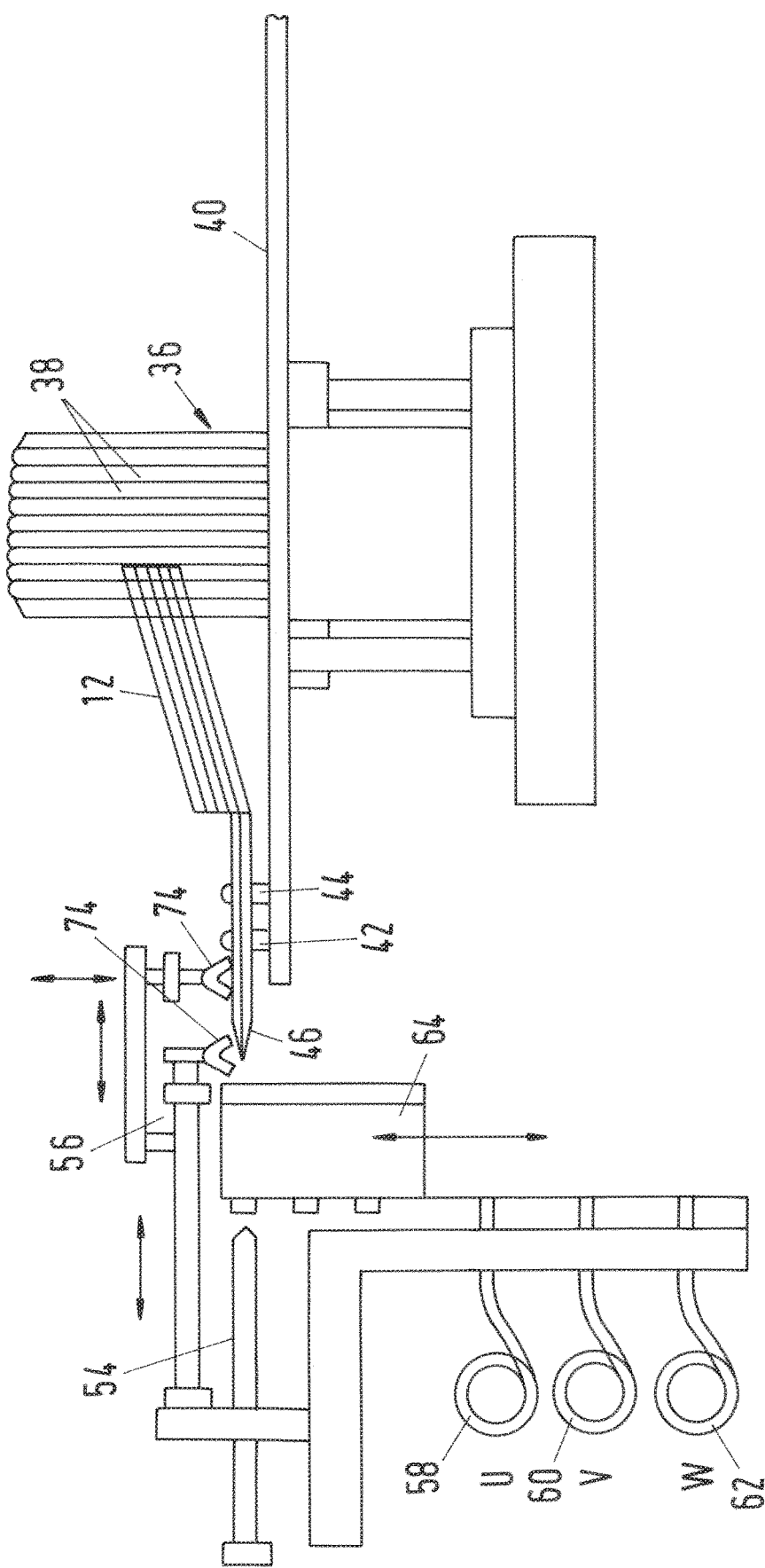
FIG. 5 is a schematic side view of a device for fitting the winding ends and beginnings with slide-on tubes.

FIGS. 5 to 11 illustrate the slide-on tubes 52 being slid on. FIG. 5 illustrates the draw-in tool 36 with a coil winding 12 deposited therein, the winding beginning 32 and end 46 of which are deposited in the first position holders 42, 44. A centring device 54 and an attaching device 56 are illustrated and place the slide-on tubes 52 having a certain length onto the winding ends 46 and the winding beginnings 32. For this purpose, the slide-on tubes 52 are first drawn from supply rolls 58, 60, 62, transferred into a magazine 64, and cut to a desired length from the tube stock. During this process, the slide-on tubes 52 thus produced assume a predefined position in the magazine 64. If no colour distinction is desired, for example according to the phase affiliation of the ends of the windings to be covered, a single tube colour can also be used.

Figure 6:
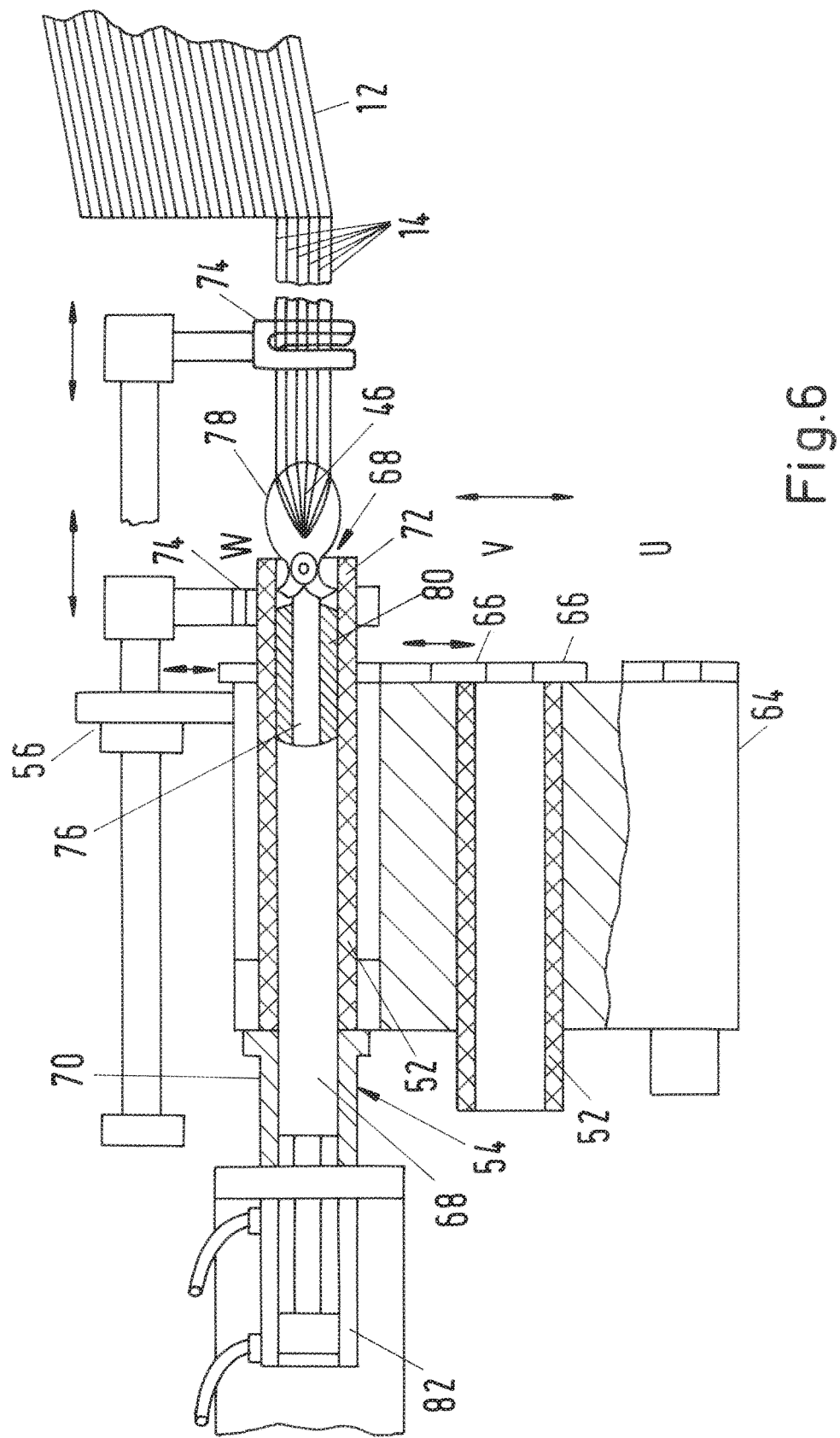
FIG. 6 is a detailed view of a centring device of the fitting device.
Figure 7:
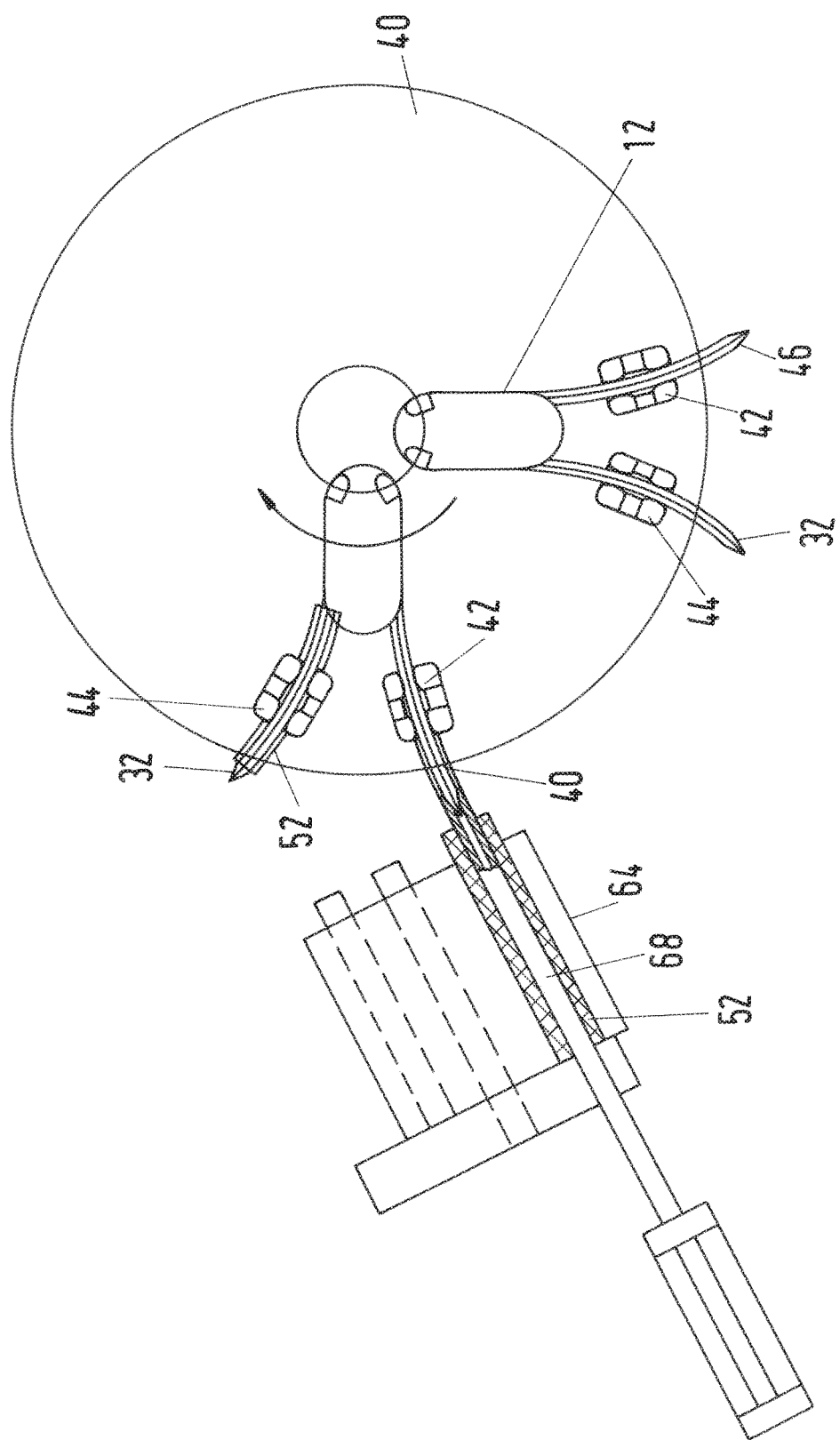
FIG. 7 is a schematic plan view of the centring device.

The magazine 64 can be displaced vertically with respect to the orientation of the slide-on tubes 52, so that the desired slide-on tube can move flush with the centring device 54. Refer also to FIG. 6 in the following in this regard. In FIG. 6 the magazine 64 is illustrated in a partial cut-away view, wherein it is supplied with three slide-on tubes having different colour coding. While the lower two slide-on tubes in the illustration are secured in the magazine by a movable locking device 66, the uppermost slide-on tube 52 is aligned flush with the centring device 54 and the twisted winding end 46. The winding end 46 or a winding beginning 32 to be provided with a slide-on tube is also aligned by suitable rotation and, if necessary, adjustment of the height of the bobbin plate 40.

In the position shown in FIG. 6, a gripper 68 has also already been inserted into the slide-on tube 52 to be drawn on. After the relevant locking device 66 has been opened, a slide 70 has also already advanced the slide-on tube out of the magazine by a distance, whereby the tube end 72 protruding from the magazine 64 can be axially clamped by a carrier 74 of the attaching device 56.

In the exemplary embodiment shown, the gripper 68 inserted into the slide-on tube 52 has a bearing mandrel 76, a pincer-like device 78 articulated thereon, and an actuating tube 80 comprising the bearing mandrel and acting on the pincer-like device. This gripper is illustrated in greater detail in FIGS. 9 and 10. The actuating tube 80 is axially movable separately from the mandrel 76, for which purpose an actuating device 82 (not explained in greater detail) is provided and works, for example, with pneumatic actuating cylinders. In FIG. 6, the pincer-like device 78 is illustrated in a closed position in which it fixes the winding end 46 shown here and compresses the individual wires 14 so that their diameter is smaller than the inner diameter of the slide-on tube 52 seated on the actuating tube 80 with slight clearance.

Figure 10:
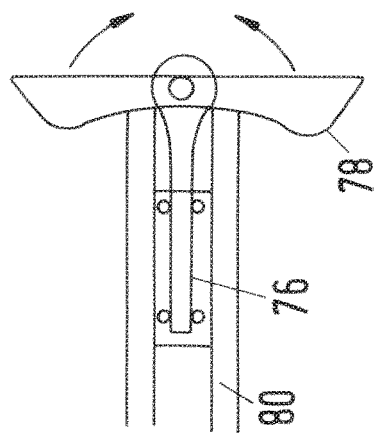
FIG. 10 is a section of the gripper according to FIG. 9 in the open position.

When it is pushed into the slide-on tube, the pincer-like device 78 is closed and its outer diameter is minimized, the pincer-like device being brought to a maximally open state, for example by a restoring spring, when the actuating tube 80 is retracted by a certain distance (see FIG. 10). The pincer-like device 78 is now closed by axially adjusting the actuating tube 80 relative to the bearing mandrel 76 (see FIG. 9), the pincer-like device gripping the winding end 46 or the winding beginning 32, centring it with respect to the slide-on tube 52 and compacting it.

After this process, the carrier 74 of the slide-on device 56 is displaced axially, carrying the slide-on tube 52 in a friction fit or by tooth-like projections (not shown) which engage in the fabric or the elastic material of the tube being used in a form fit until the entire slide-on tube 52 is drawn onto the winding end 46. After the winding end 46 has been provided with a slide-on tube 52, the process for the winding beginning 32 is repeated once the bobbin plate 40 has been rotated accordingly (see FIG. 7), and the assembly can also take place in the reverse order.

Figure 11:
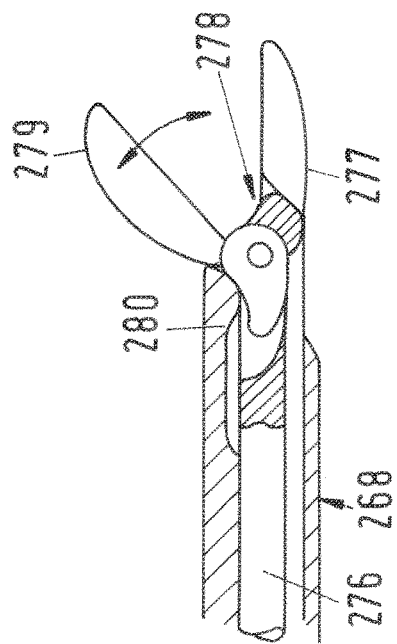
FIG. 11 is a schematic of a further embodiment of a gripper of the centring device.
Figure 9:
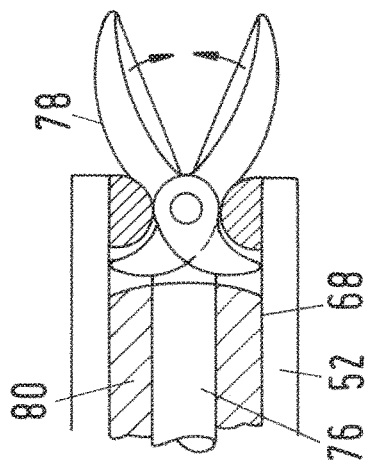
FIG. 9 is a schematic section of a second embodiment of a gripper of the centring device in the semi-closed position.
Figure 8:
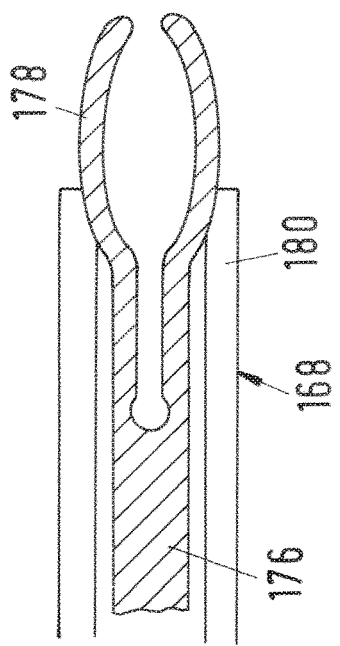
FIG. 8 is a schematic section of a first embodiment of a gripper of the centring device.

FIGS. 8 and 11 illustrate two further exemplary embodiments for grippers 168 and 268, respectively. In the gripper 168 shown in FIG. 8, the pincer-like device 178 is formed integrally with the bearing mandrel 176 as a type of spring fork, the pretensioning of which urges the pincer-like device 178 into the open state. The pincer-like device 178 can then be closed against the restoring force of the spring fork by a relative movement of the actuating tube 180.

FIG. 11 illustrates a gripper 268 in which the actuating tube 280 acts only on one pincer 279 of the pincer-like device 278, while the second pincer 277 is embodied rigid with the bearing mandrel 276.

Figure 12:
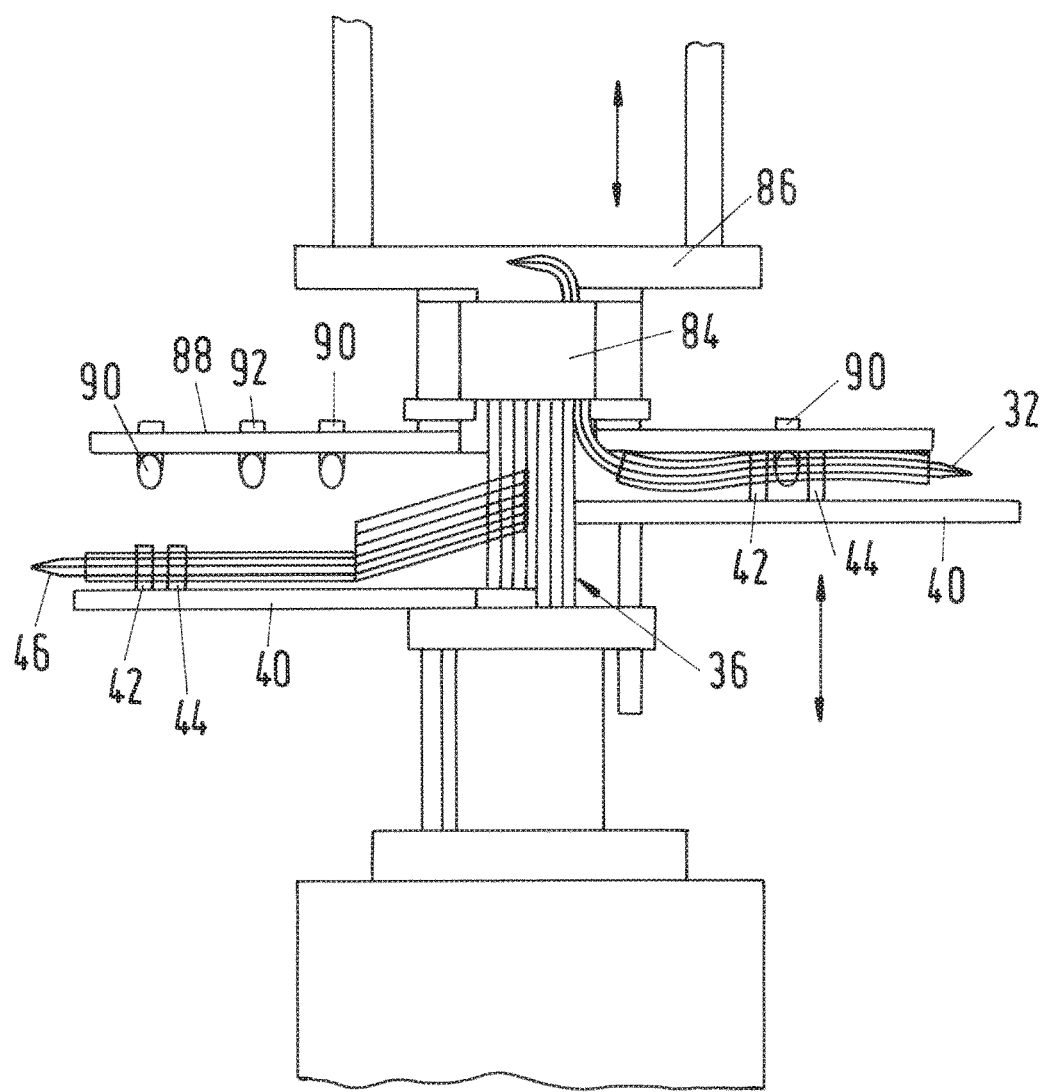
FIG. 12 is a schematic view of the coil windings being drawn into a stator body.

FIG. 12 illustrates the known drawing-in of the coil windings into the grooves (not shown individually) of a stator body 84. While the drawing in itself follows known processes and shall therefore not be explained in greater detail here, a disc-shaped support 88 with second position holders 90, 92 is provided on a stator carrier 86, which holds the stator body 84 in a defined position, and they take over and clamp the winding ends 46 and winding beginnings 32 which are clamped in the first position holders 42, 44 in the stator carrier 84 when the coil winding 12 are drawn in. It is helpful in this case that the winding ends 46 and beginnings 32 are already covered with the slide-on tubes 52, so that it is ensured that all the individual wires 14 are also transferred into the second position holders 90, 92. This can be done by first position holders 42, 44 and/or second position holders 90, 92 that can be actively adjusted between a released position and a clamping position, or by coordinated clamping forces in passive holding elements.

Figure 13:
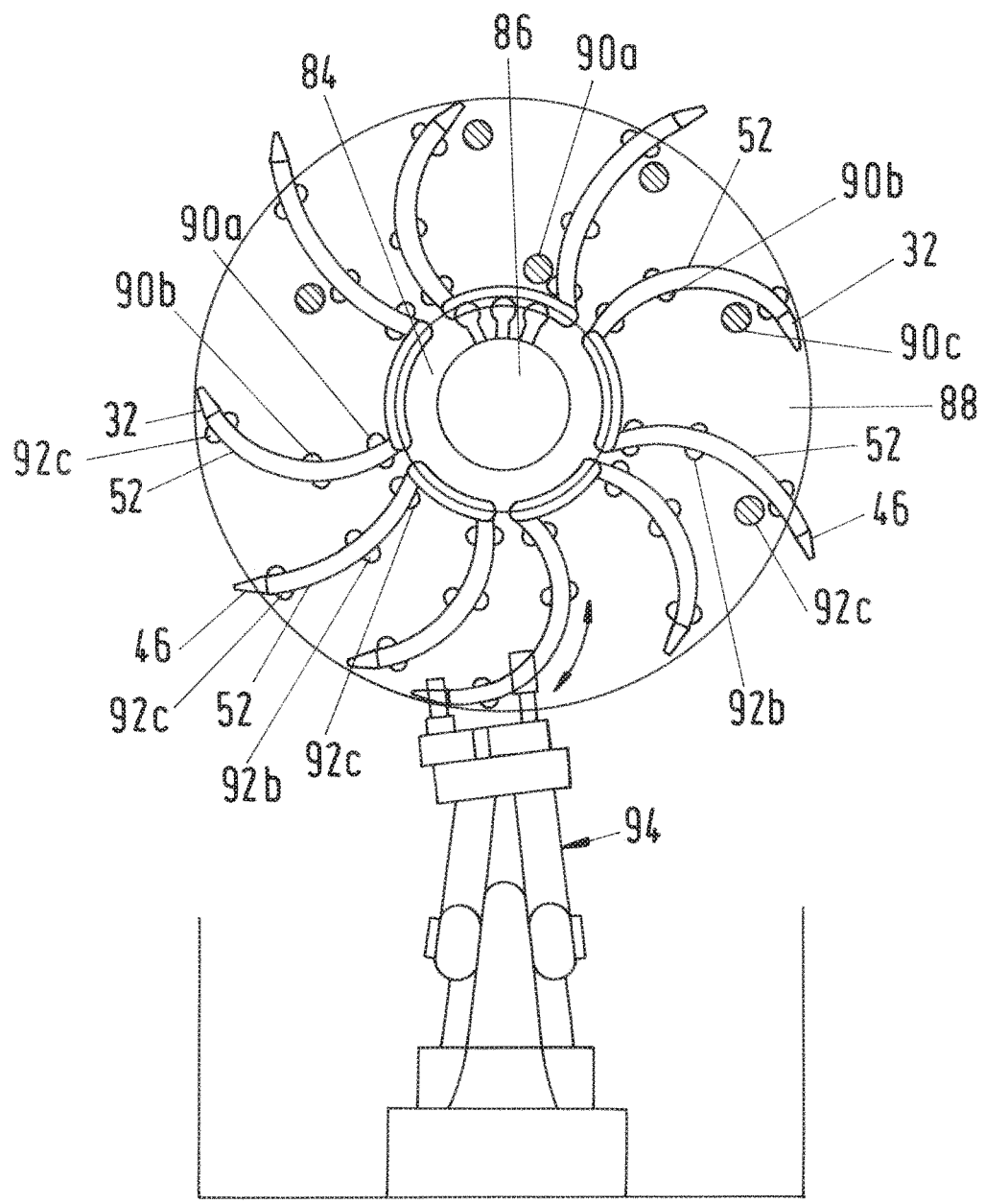
FIG. 13 is a view from below of the stator carrier from FIG. 12 with a positioning gripper.

In FIG. 12 it can also be seen that the bobbin plate 40 of the draw-in tool 36 should be moved very close to the disk-shaped support 88 of the stator carrier 86, for which purpose an axial adjustment of the spool plate 40 separate from the draw-in lamellae 38 can be helpful if necessary. However, it is also possible to transfer the winding ends and beginnings with robotic grippers. Furthermore, it can be seen in FIG. 12 that the diameter of the disk-like support 88 is smaller than the diameter of the bobbin plate 40. With reference to FIG. 13, this is made possible by the fact that there are a plurality of second position holders 90, 92, the winding ends and beginnings being curved such that their radial extension is reduced. A robotic gripping device 94 accomplishes targeted depositing into the three position holders 90a, 90b, 90c and 92a, 92b, 92c for each winding end 46 and each winding beginning 32. In addition to the possible reduced diameter of the disk-shaped support 88 of the stator carrier 86, which simplifies handling of the fitted stator carrier 86 in further process steps, the depositing in three position holders per winding beginning and winding end has the further advantage that the winding ends 46 and beginnings 32 are deposited in an even more precisely defined position, so that gripping is simplified in further process steps, e.g. for welding on electrical connecting lugs.

The invention is not limited to any of the above-described embodiments, but can be modified in many ways.

All of the features and advantages arising from the claims, the description, and the drawings, including constructive details, spatial arrangements, and method steps, may be essential to the invention both individually and in many different combinations.

List of reference numbers

| | |
|---|---|
| 10 | Winding device |
| 12 | Coil winding |
| 14 | Individual wires |
| 16 | Wire feed device |
| 18 | First fixed wire guide |
| 20 | Second fixed wire guide |
| 22 | Rotatable single wire guide |
| 24 | Drive shaft |
| 26 | Gear drive |
| 28 | Wire winder |
| 30 | Winding template |
| 32 | Winding beginning |
| 34 | Template wire holding element |
| 36 | Draw-in tool |
| 38 | Draw-in lamellae |
| 40 | Bobbin plate |
| 42 | First position holder |
| 44 | First position holder |
| 46 | Winding end |
| 48 | First handling gripper |
| 50 | Second handling gripper |
| 52 | Push-on tubes |
| 54 | Centring device |
| 56 | Attaching device |
| 58 | First tube roll |
| 60 | Second tube roll |
| 62 | Third tube roll |
| 64 | Magazine |
| 66 | Locking device |
| 68 | Gripper |
| 70 | Slide |
| 72 | Tube end |
| 74 | Carrier |
| 76 | Bearing mandrel |
| 78 | Pincer-like device |
| 80 | Actuating tube |
| 82 | Actuating device |
| 84 | Stator body |
| 86 | Stator carrier |
| 88 | Disc-shaped support |
| 90 | Second position holder |
| 92 | Second position holder |
| 94 | Robotic gripping device |
| 168 | Gripper |
| 176 | Bearing mandrel |
| 178 | Pincer-like device |
| 180 | Actuating tube |
| 268 | Gripper |
| 276 | Bearing mandrel |
| 277 | Second pincer half |
| 278 | Pincer-like device |
| 279 | First pincer half |
| 280 | Actuating tube |

What is claimed is:

1. A method of manufacturing an electric motor, the method comprising:
    drawing a plurality of coil windings into a plurality of grooves of a stator or a rotor of an electric engine, wherein the coil windings comprise a plurality of wires;
    gripping and compacting a first end of a first wire of the plurality of wires using a wire gripper;
    passing the first end of the first wire into a slide-on tube; and
    connecting a second end of a second wire of the plurality of wires to the first end within the slide-on tube to produce a connection wire of the stator or rotor.

2. The method of claim 1, further comprising sliding the slide-on tube onto the first and second ends before the plurality of coil windings are drawn into the stator or rotor.

3. The method of claim 1, wherein compacting the first wire further comprises compacting the first wire to a diameter the is smaller than an inner diameter of the slide-on tube.

4. The method of claim 1, further comprising twisting the plurality of wires with each other to form the first and second ends.

5. The method of claim 1, further comprising guiding the first end using characterised in that the individual wires (14) in the region of the wire supply device (16) are guided by a rotatable wire guide.

6. The method of claim 1, further comprising widening an inner diameter of the slide-on tube before being slid onto the first end.

7. The method of claim 1, further comprising aligning the slide-on tube with the first end using a centering device comprising the wire gripper to engage the slide-on tube.

8. The method of claim 1, further comprising configuring the wire gripper to be moveable.

9. The method of claim 7, further comprising receiving the slide-on tube in a magazine.

10. The method of claim 1, further comprising positioning the fastened first and second in one of a plurality of second position holders.

11. An apparatus comprising:
    a wire supply unit for parallel feeding a plurality of wires comprising a coil winding for a stator or rotor of an electric motor;
    a wire winder on which the coil winding is wound,
    a wire gripper configured to grip and compact a first end of a first wire of the plurality of wires;
    a slide-on tube configured to connect the first end to a second end of a second wire of the plurality of wires;
    a draw-in tool for receiving the coil winding after winding; and
    a transfer device for transferring the coil winding from the draw-in tool into the stator or rotor.

12. The apparatus of claim 11, further comprising a wire guide configured to be rotated about an axis of rotation parallel to a feed direction of the first to the wire winder.

13. The apparatus of claim 11, further comprising a first position holder for the first end, and a second position holder for the second end.

14. The apparatus of claim 11, further comprising a centering device for aligning the first end.

15. The apparatus of claim 11, wherein the first wire is compacted to enable the first end to pass through an inner diameter of the slide-on tube.

16. The apparatus of claim 11, further comprising at least one carrier for gripping and drawing or sliding the slide-on tube onto the first or second end.

17. The apparatus of claim 11, wherein the wire gripper comprises a pincer-like device and an actuating tube that is movable axially relative to the pincer-like device.

18. The apparatus of claim 11, further comprising a slide-on device configured to position the slide-on tube around the first and second ends.

19. The apparatus of claim 13, wherein the first position holder is provided in a defined position with respect to the draw-in tool.

20. The method of claim 1, wherein the connecting further comprises connecting the plurality of wires in phases.

* * * * *